W. R. CLAYTON.
APPARATUS FOR PRESERVING BODIES.
APPLICATION FILED JUNE 12, 1916.

1,213,335.

Patented Jan. 23, 1917.

WITNESSES:

INVENTOR.
William R. Clayton
BY
ATTORNEY

UNITED STATES PATENT OFFICE.

WILLIAM R. CLAYTON, OF CHICAGO, ILLINOIS.

APPARATUS FOR PRESERVING BODIES.

1,213,335.  Specification of Letters Patent. Patented Jan. 23, 1917.

Application filed June 12, 1916. Serial No. 103,189.

*To all whom it may concern:*

Be it known that I, WILLIAM R. CLAYTON, a citizen of the United States, residing at Chicago, in the county of Cook and State of Illinois, have invented certain new and useful Improvements in Apparatus for Preserving Bodies, of which the following is a specification.

This invention relates to apparatus for preserving bodies and has for one of its objects the provision of means whereby the atmosphere of the casket containing the body and of the inclosing container may be maintained in dry condition indefinitely.

A further object of my invention is the provision of means for separately drying the atmosphere in the interior of and surrounding the casket so that there is no possibility of contamination.

A still further object of my invention is the provision in an absolutely sealed container of means for desiccating a body placed therein and taking up the moisture withdrawn from the body, the interior of the container being maintained in a dry condition.

Further objects and advantages of my invention will be apparent as it is better understood by reference to the following specification when read in connection with the accompanying drawing, illustrating the preferred embodiment thereof, in which—

Figure 1:
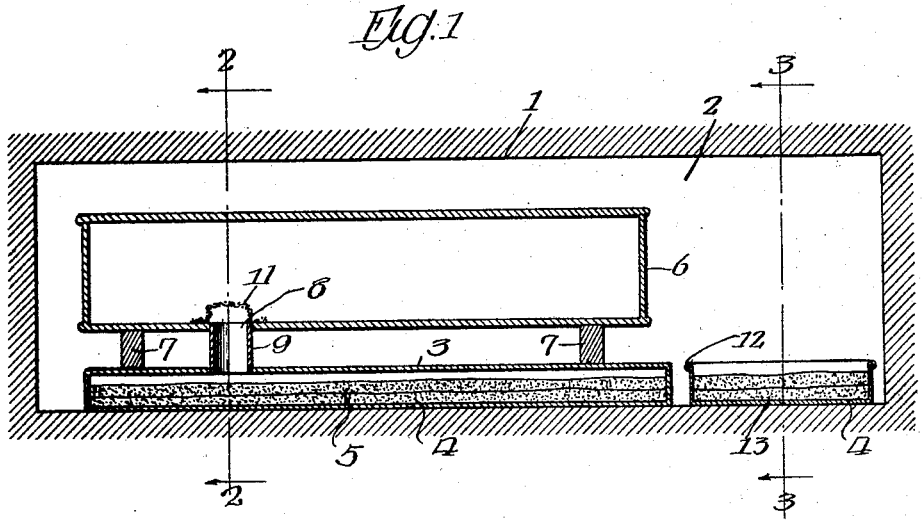
Figures 2, 3:
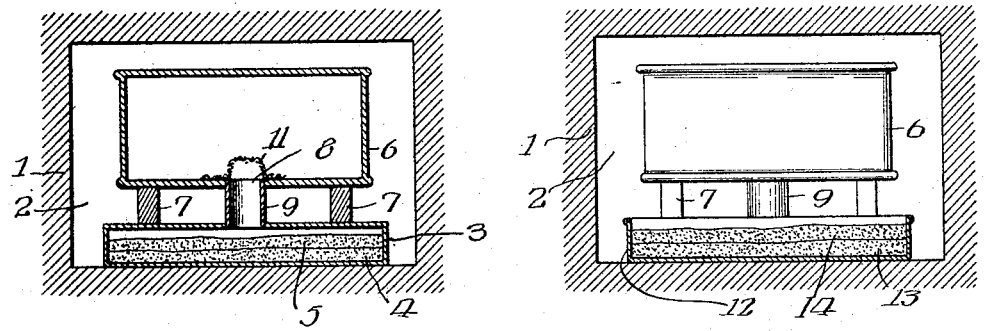

Figure 1 is a longitudinal section through an apparatus according to my invention; Fig. 2 is a transverse section on the line 2—2 of Fig. 1; and Fig. 3 is a transverse section on the line 3—3 of Fig. 1.

Referring to the drawing 1 indicates an air and moisture-proof container which may be of any suitable construction either of wood, metal or masonry providing an absolutely sealed chamber 2. Within the chamber 2 a closed receptacle 3 is disposed containing a supply of desiccating material. The desiccating material best adapted for the purpose comprises calcium chlorid and calcined gypsum and is preferably arranged in the form of a layer 4 of calcined gypsum and a layer 5 of calcium chlorid disposed thereabove. The function of the calcium chlorid is to withdraw moisture from the atmosphere, the moisture being taken up as water of crystallization by the calcined gypsum, with the result that the desiccating material remains dry indefinitely. The calcium chlorid and calcined gypsum may be mixed instead of being disposed in layers as described but the calcium chlorid may under these conditions become coated with the gypsum and lose some of its efficiency.

The casket 6 is supported preferably on transverse members 7 above the receptacle 3 and is permanently closed except for an opening 8 in its bottom which is connected by a conduit 9 to the interior of the container 3. A wire cage 11 is preferably disposed above the opening 8 to prevent choking of the conduit 9. It will be readily understood that communication is established by the conduit 9 between the atmosphere of the interior of the casket 6 and the desiccating material within the container 3 and any moisture which is given off by a body disposed within the casket 6 will be immediately withdrawn from the atmosphere by the desiccating material.

An open container 12 is disposed within the chamber 2 adjacent the end of the container 3 and is provided with layers 13 and 14 of calcined gypsum and calcium chlorid, respectively. This material provides for the separate desiccation of the atmosphere within the chamber 2. It will be apparent that the atmosphere of the chamber 2 is not subjected to contamination since the body is completely inclosed within the casket 6 and the air surrounding the body has access only to the desiccating material within the container 3. Accordingly, should it be necessary to open the container 1 the person so doing will not be subjected to discomfort or danger and the body within the casket 6 will be in no way affected.

I desire to particularly emphasize the advantages of employing calcium chlorid and calcined gypsum together as a desiccating material as it is well known that calcium chlorid has a strong attraction for moisture but the moisture when taken up by the calcium chlorid rapidly forms a pool of water in which the calcium chlorid dissolves. Such a condition would be extremely objectionable in an apparatus of the character described and the use of gypsum furnishes a ready solution of the problem because of its attraction for water and the fact that the water is taken up as water of crystallization. The necessary quantities of calcium chlorid and calcined gypsum may be readily calculated to properly perform their necessary functions.

From the foregoing it will be understood that I have perfected an apparatus for preserving bodies which results in material advantages inasmuch as under the conditions set up on the apparatus a body may be preserved indefinitely free from the ravages of decay and mold which result principally from the presence of moisture.

It will be apparent that various changes may be made in the form, construction and arrangement of the parts without departing from the spirit and scope of the invention or sacrificing any of its material advantages, the form hereinbefore described being merely a preferred embodiment thereof.

I claim:

1. In a desiccating apparatus, the combination of a sealed container, a casket therein, a closed receptacle within said container supporting a quantity of desiccating material, and a conduit connecting the interior of said casket and receptacle.

2. In a desiccating apparatus, the combination of a sealed container, a casket therein, a closed receptacle within said container supporting a quantity of desiccating material, a conduit connecting the interior of said casket and receptacle, and an open receptacle within said container supporting a quantity of desiccating material.

3. In a desiccating apparatus, the combination of a sealed container, a casket therein, and a quantity of calcium chlorid and calcined gypsum arranged within said container to attract and take up moisture from the atmosphere.

4. In a desiccating apparatus, the combination of a sealed container, a casket therein, a receptacle within said container, supporting a quantity of calcium chlorid and calcined gypsum, and communicating means between said receptacle and the interior of said casket.

5. In a desiccating apparatus, the combination of a sealed container, a casket therein, a closed receptacle within said container supporting a quantity of calcium chlorid and calcined gypsum, and a conduit connecting the interior of said casket and receptacle.

6. In a desiccating apparatus, the combination of a sealed container, a casket therein, a closed receptacle within said container supporting a quantity of calcium chlorid and calcined gypsum, a conduit connecting the interior of said casket and receptacle, and an open receptacle within said container supporting a quantity of calcium chlorid and calcined gypsum.

7. In a desiccating apparatus, the combination of a sealed container, a casket therein, a closed receptacle within said container, a quantity of desiccating material within said receptacle, an opening in the bottom of said casket, and a conduit connecting said opening with the interior of said receptacle.

8. In a desiccating apparatus, the combination of a sealed container, a casket therein, a closed receptacle within said container supporting separate layers of calcium chlorid and calcined gypsum, and communicating means between the interiors of said casket and receptacle.

WILLIAM R. CLAYTON.

Witnesses:
ERNEST H. MERCHANT,
W. T. WESTERBERG.